(12) United States Patent
Imsand

(10) Patent No.: US 7,035,093 B2
(45) Date of Patent: Apr. 25, 2006

(54) PACKAGING MECHANISM FOR A PORTABLE COMPUTER

(75) Inventor: Bruce Imsand, Madison, AL (US)

(73) Assignee: MaxVision Corporation, Madison, AL (US)

( * ) Notice: Subject to any disclaimer, the term of this patent is extended or adjusted under 35 U.S.C. 154(b) by 143 days.

(21) Appl. No.: 10/771,879

(22) Filed: Feb. 3, 2004

(65) Prior Publication Data

US 2004/0218353 A1    Nov. 4, 2004

Related U.S. Application Data

(60) Provisional application No. 60/444,419, filed on Feb. 3, 2003.

(51) Int. Cl.
*H05K 7/00* (2006.01)
(52) U.S. Cl. ........................................ 361/683; 361/724
(58) Field of Classification Search ................ 361/683, 361/685, 687, 724–726
See application file for complete search history.

(56) References Cited

U.S. PATENT DOCUMENTS

| | | | | |
|---|---|---|---|---|
| 4,837,590 A * | 6/1989 | Sprague | ...................... | 346/145 |
| 5,212,628 A * | 5/1993 | Bradbury | ..................... | 361/683 |
| 5,242,056 A * | 9/1993 | Zia et al. | ..................... | 206/576 |
| 5,552,957 A * | 9/1996 | Brown et al. | ............... | 361/683 |
| 5,717,567 A * | 2/1998 | Tao | ............................ | 361/683 |
| 5,774,331 A * | 6/1998 | Sach | .......................... | 361/683 |
| 5,872,557 A * | 2/1999 | Wiemer et al. | ............. | 345/156 |
| 5,883,820 A * | 3/1999 | Ota et al. | .................. | 361/683 |
| 6,229,698 B1* | 5/2001 | Harvey | ....................... | 361/683 |
| 6,307,744 B1* | 10/2001 | Faranda et al. | ............ | 361/685 |
| 6,554,133 B1* | 4/2003 | Kropf et al. | ................ | 206/320 |
| 6,597,568 B1* | 7/2003 | Ryder | ......................... | 361/683 |
| 6,775,147 B1* | 8/2004 | Kim et al. | .................. | 361/752 |
| 2002/0145847 A1* | 10/2002 | Crosby | ....................... | 361/683 |
| 2003/0122457 A1* | 7/2003 | Diaz et al. | ............... | 312/223.2 |

* cited by examiner

*Primary Examiner*—Lisa Lea-Edmonds
*Assistant Examiner*—Ingrid Wright
(74) *Attorney, Agent, or Firm*—David E. Mixon; Bradley Arant Rose and White, LLP

(57) ABSTRACT

A high performance workstation computer to be portable without any performance limitations has been developed. The portable computer includes a computer unit, a protective case, and a protective cover. The computer unit is mounted in the protective case and may be removed if the user desires. The protective cover attaches to the protective case and it contains the accessories for the computer unit. A footing mechanism is also attached to the bottom of the protective case. It may be adjusted to properly orient the screen of the computer unit when it is operated from the protective case.

18 Claims, 21 Drawing Sheets

PACKAGING MECHANISM FOR A PORTABLE COMPUTER

CROSS-REFERENCE TO RELATED APPLICATIONS

This application claims priority from U.S. Provisional Patent Application 60/444,419 entitled "Packaging Mechanism for a Portable Computer" that was filed on Feb. 3, 2003.

BACKGROUND OF INVENTION

1. Field of the Invention

The invention relates generally to computer packaging. More specifically, the invention relates to a packaging mechanism for a portable computer.

2. Background Art

Portability is a feature that is greatly desired in computers. A whole subclass of computers commonly called "notebooks" or "laptops" has developed around the concept of portability. However, when compared with a more conventional desktop or "workstation" computer, the performance of notebooks is generally lacking. Specifically, notebook computers lag behind workstation in capabilities such as processor type and speed, available memory, etc. due to constraints on space and power consumption. Notebook computers usually are not capable of upgrade except for the addition of more memory. Also, such features as a keyboard, a screen, or a mouse (in the form of a touchpad, etc.) tend to be smaller and more difficult to use. Additionally, notebook computers tend to be fragile since there internal components are packed into minimal space. As a result, any sudden impact can easily damage the computer. A packing mechanism for a workstation computer is needed that allows for portability of a full size, full performance workstation in a rugged and convenient manner.

SUMMARY OF INVENTION

In some aspects, the invention relates to a portable computer, comprising: a computer unit; a protective case, where the computer unit is removably mounted within the protective case; a protective cover that is detachably connected to the protective case to cover the computer unit; and a footing mechanism that is located on the bottom of the protective case.

In other aspects, the invention relates to a portable computer, comprising: a computer unit; means for protecting the computer unit in a removable case; and means for adjusting the orientation of the removable case for ergonomic comfort of a user of the portable computer.

Advantages of the present invention include: a tilting mechanism that allows for an ergonomically comfortable screen orientation; a "box in box" construction that protects the interior computer unit from shocks of sudden impacts; storage of accessories in a convenient accessory pack for the computer; an interior computer "box" that can be easily removed from its protective case and rack mounted; a triple display screen configuration for the portable computer; a thermal cooling system; and a retainer support plate for PCI cards.

Other aspects and advantages of the invention will be apparent from the following description and the appended claims.

BRIEF DESCRIPTION OF DRAWINGS

It should be noted that identical features in different drawings are shown with the same reference numeral.

DETAILED DESCRIPTION

Figure 1:
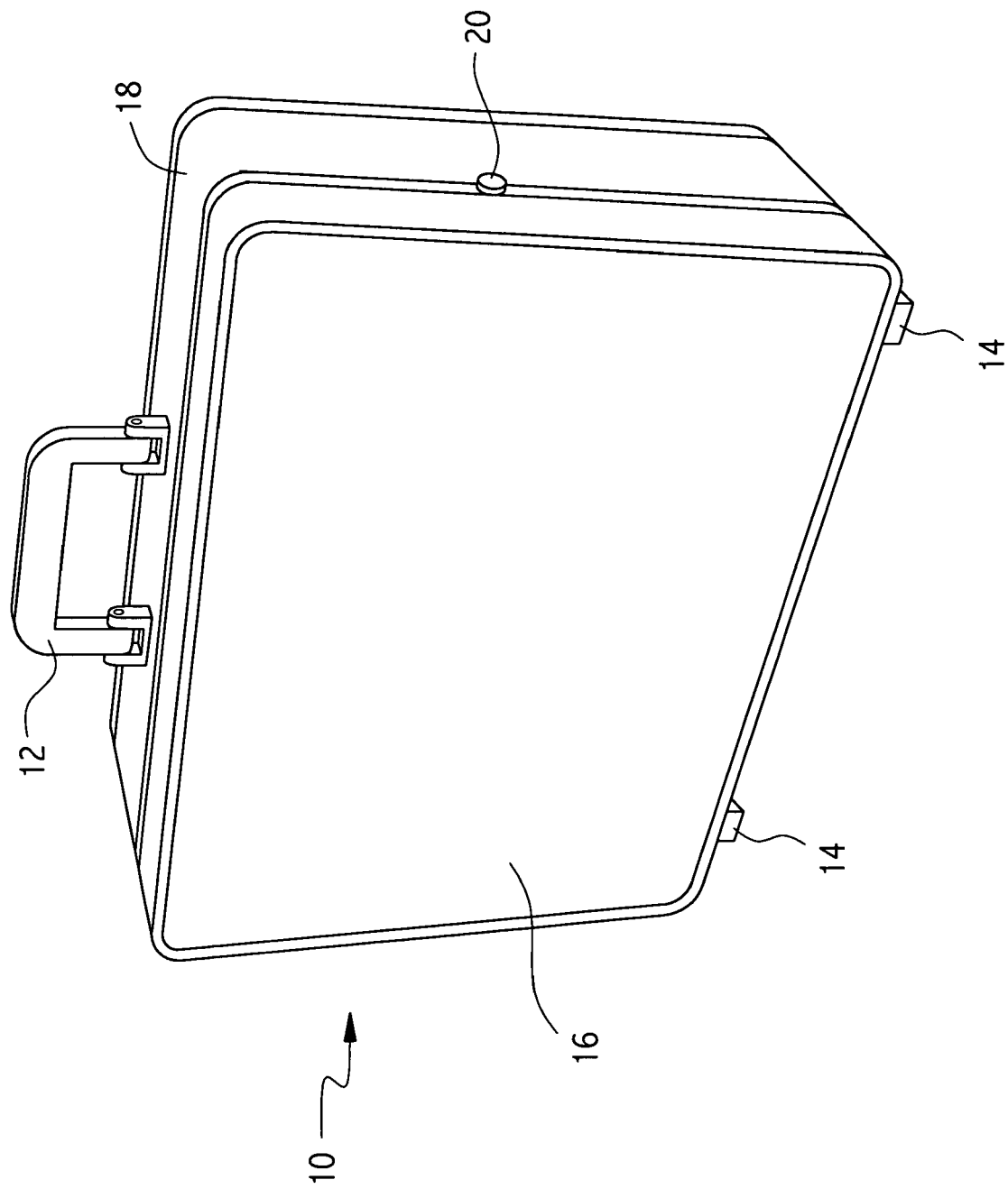
FIG. 1 shows a packed up portable computer in accordance with one embodiment of the present invention.

A packing mechanism has been developed for a portable "workstation" computer. FIG. 1 shows a packed up portable computer 10 in accordance with one embodiment of the present invention. The computer 10 is packed up in a configuration similar to a briefcase with a handle 12 on top and two footing mechanisms 14 on bottom. The computer is enclosed in a protective case 18 that has an accessory pack 16. The accessory pack is held in place by two connector buttons 20 that are spring loaded. The buttons are located on opposing sides of the accessory pack 16. The packed up computer 10 is configured to fit within the carry-on luggage size restrictions for airlines. In the present embodiment, the dimensions of the packed up computer 10 are: 19 inches long; 15 inches tall; and 6 inches deep. The computer 10 weighs between 25 to 40 pounds depending on the model of the computer.

Figure 2:
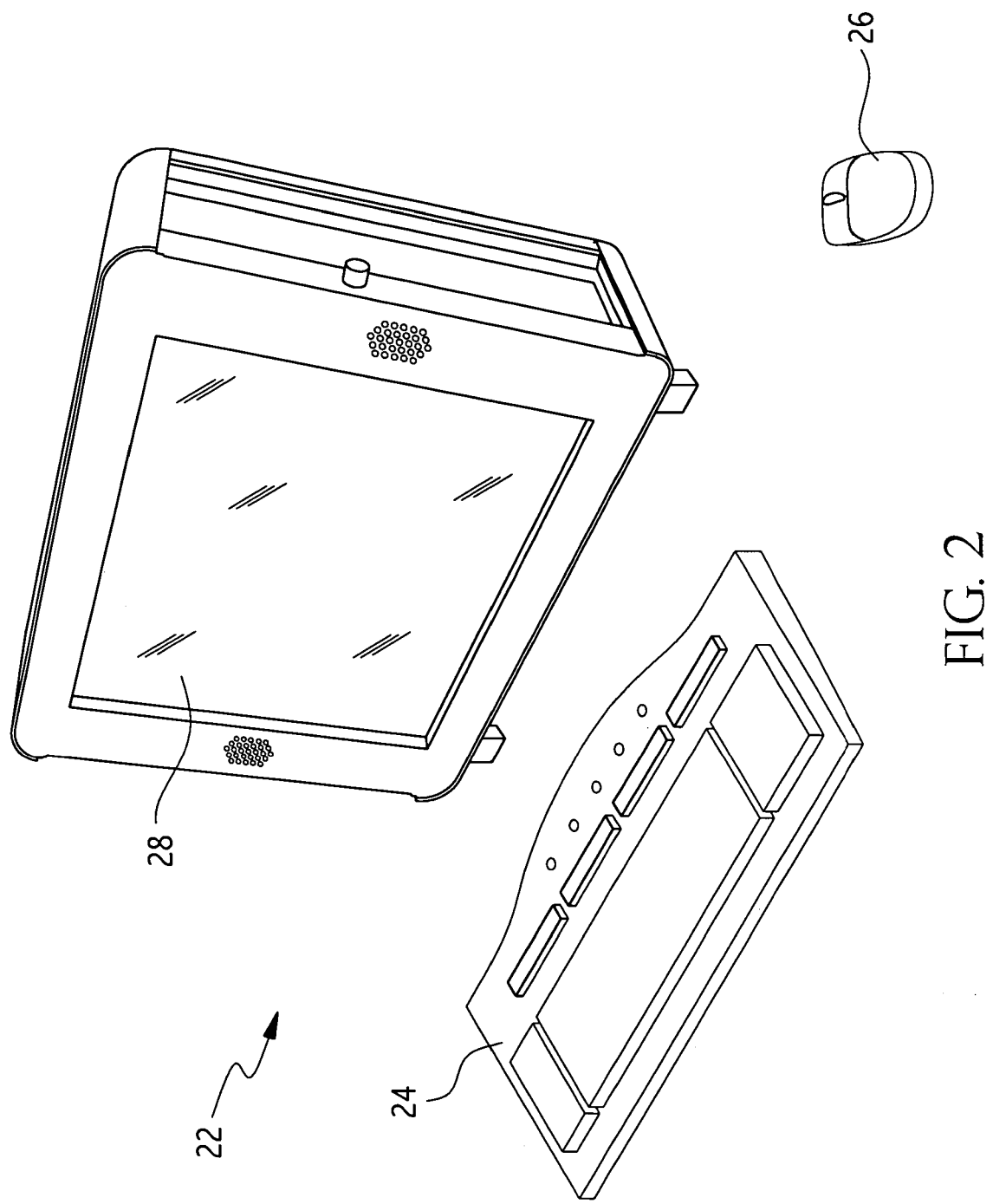
FIG. 2 shows an unpacked portable computer in accordance with one embodiment of the present invention.
Figure 3:
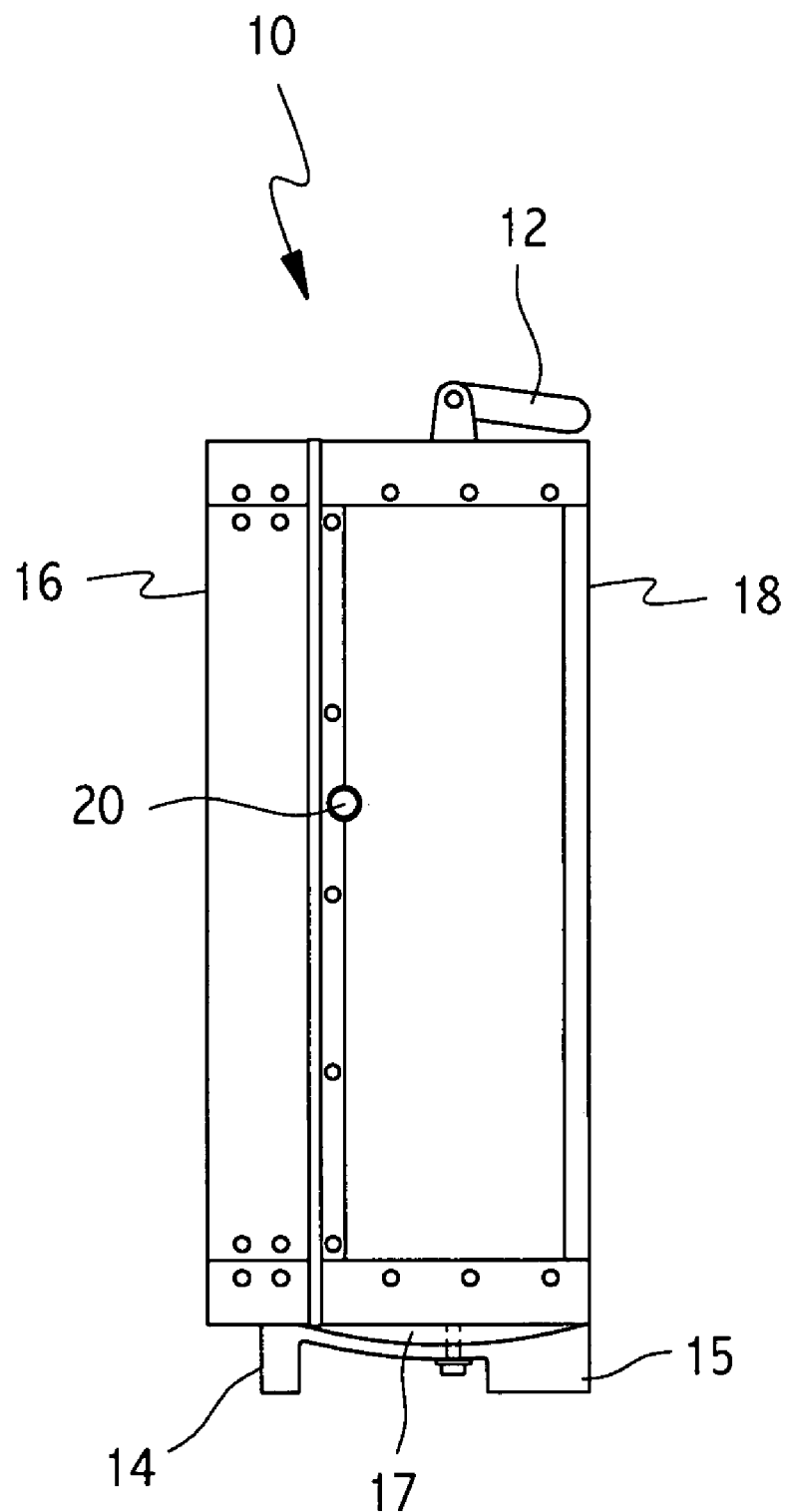
FIG. 3 shows a side view of a packed up portable computer in accordance with one embodiment of the present invention.

FIG. 2 shows an unpacked portable computer 22 in accordance with one embodiment of the present invention. The computer includes a flat-panel screen 28 along with a keyboard 24 and mouse 26. In the embodiment shown, a wireless keyboard and a wireless mouse are used. However, alternative types of devices may be used in other embodiments. FIG. 3 shows a side view of a packed up portable computer 10 in accordance with one embodiment of the present invention.

Figure 4:
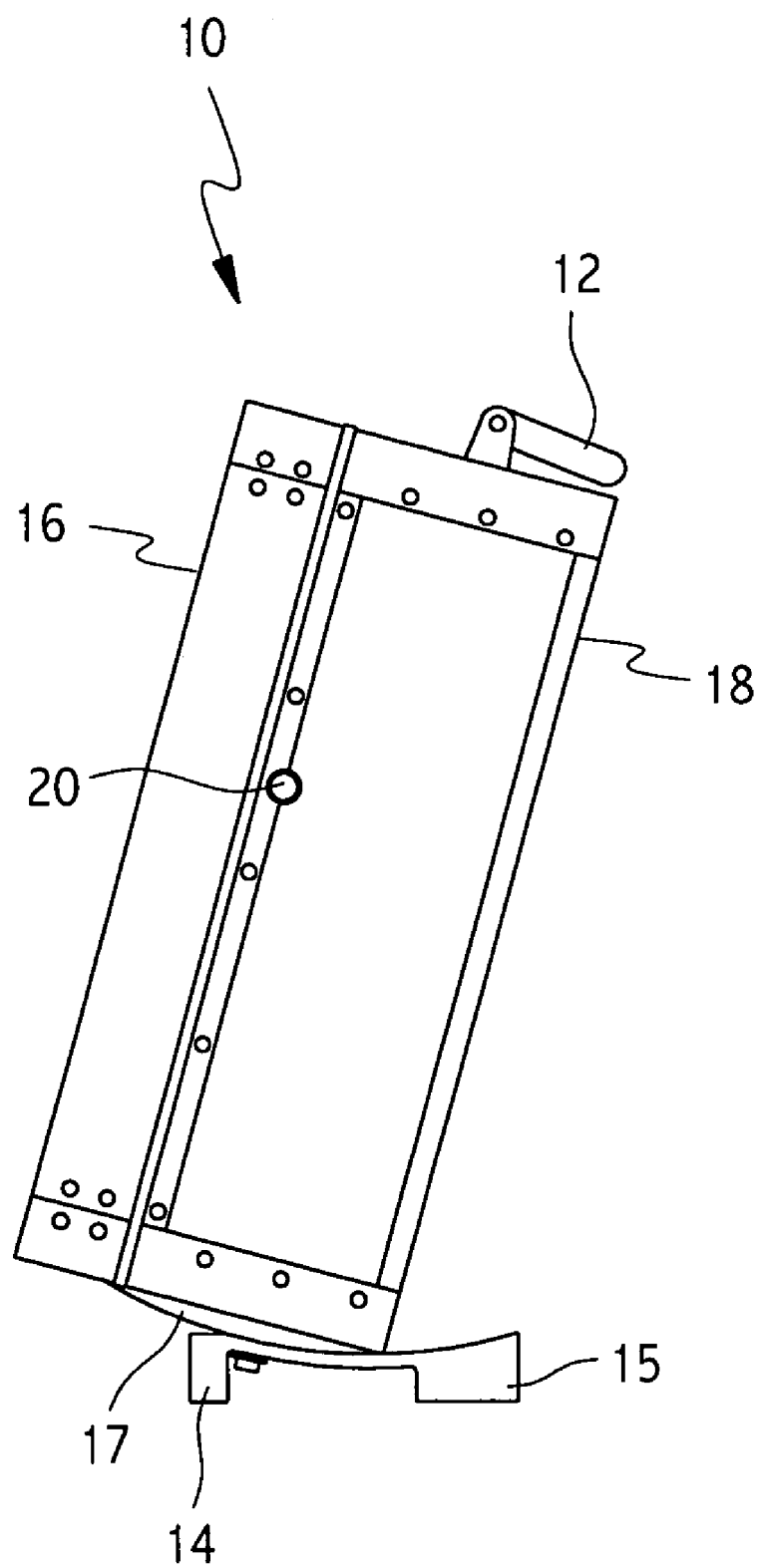
FIG. 4 shows a side view of a packed up portable computer that is tilted back in accordance with one embodiment of the present invention.

The footing mechanisms 14 have the capacity to tilt the computer to an ergonomically comfortable position for the user. The footing 14 is capable of tilting to an angle of up to 18°. The footing mechanism 14 includes two parts: a slide 17 that is attached to the bottom of the protective case 18; and a cradle 15 that sits on the floor and holds the slide 17 in an internal track (not shown). FIG. 4 shows a side view of a packed up portable computer 10 that is tilted back in accordance with one embodiment of the present invention. In this Figure, the computer 10 is tilted back to an angle of about 18°. The slide 17 of the footing mechanism 14 is positioned all the way forward in cradle 15.

Figure 5:
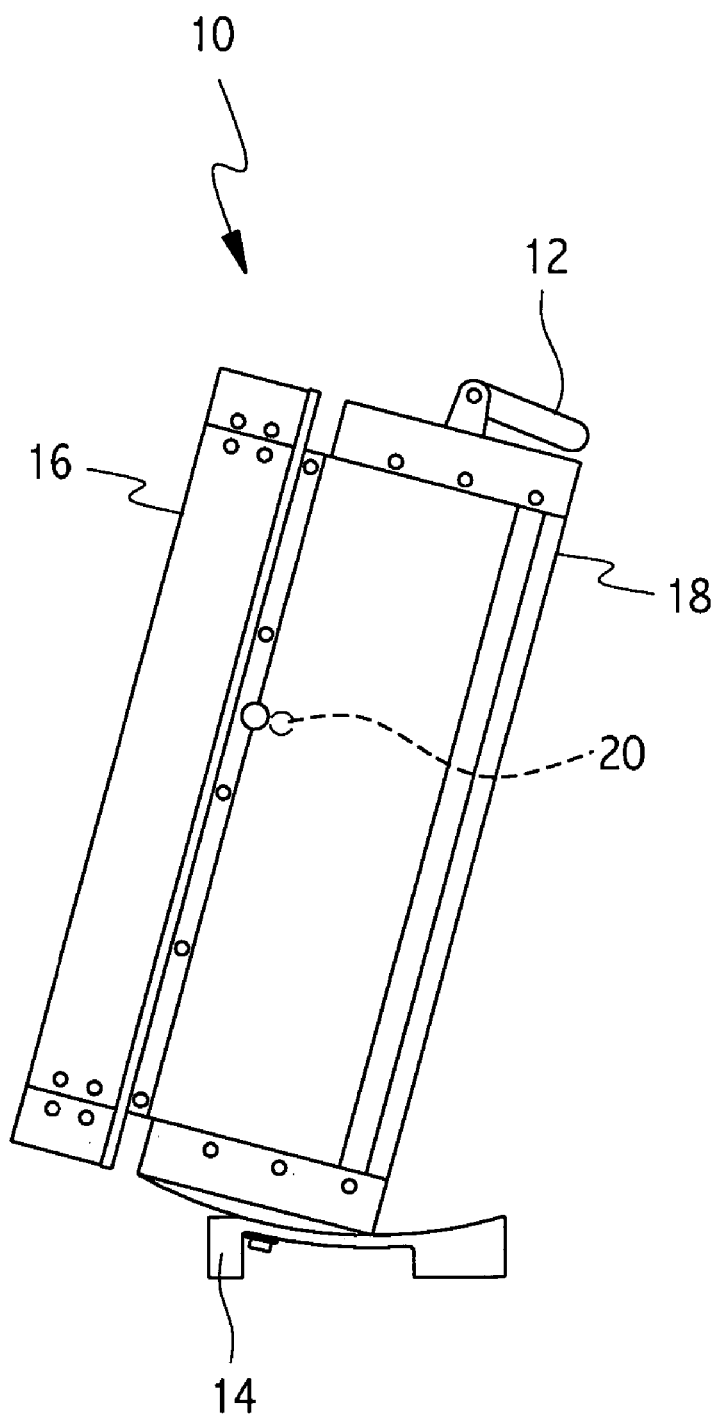
FIG. 5 shows a side view of a packed up portable computer with the accessory pack disengaged in accordance with one embodiment of the present invention.
Figure 6:
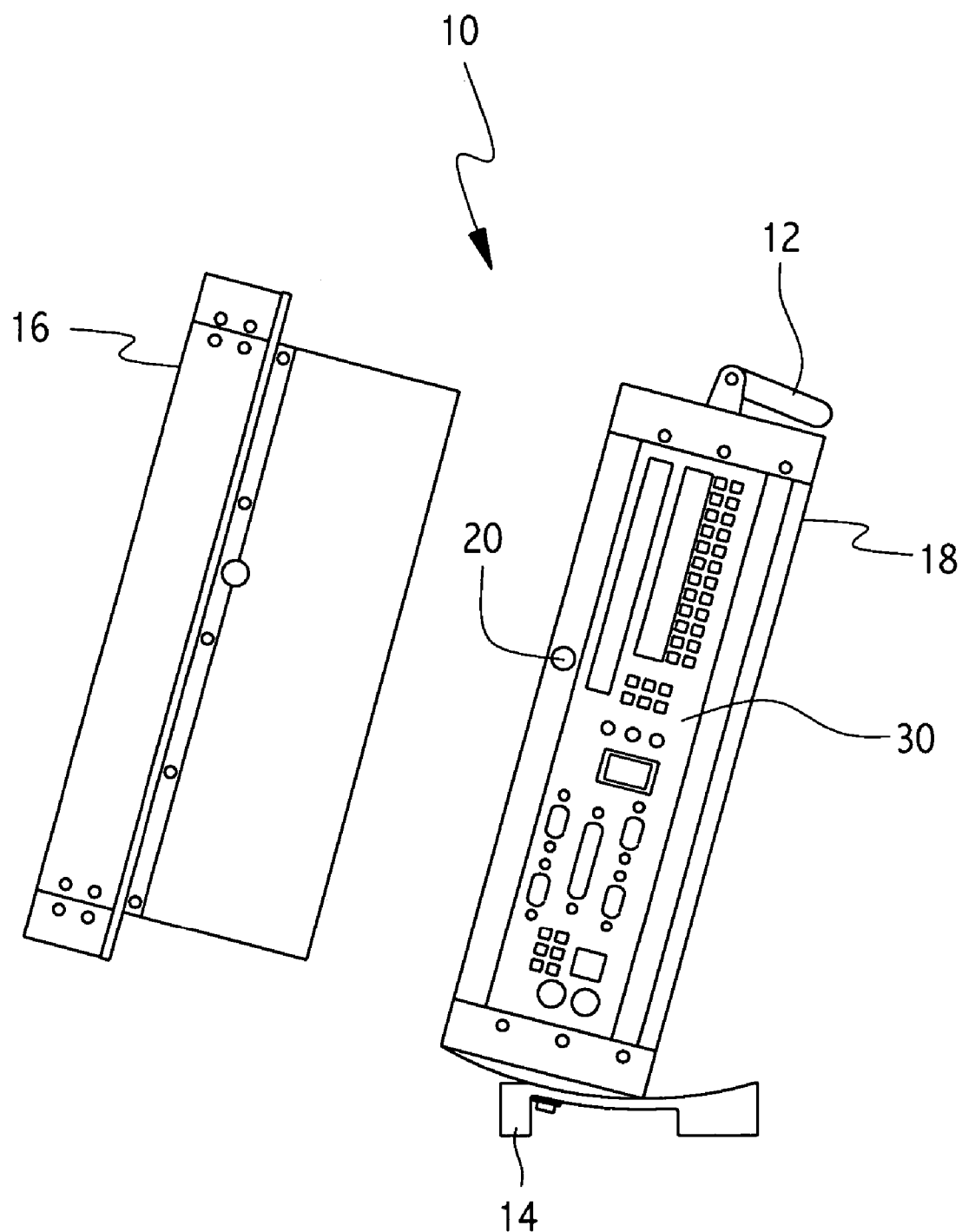
FIG. 6 shows a side view of a portable computer with the accessory pack removed in accordance with one embodiment of the present invention.
Figure 7:
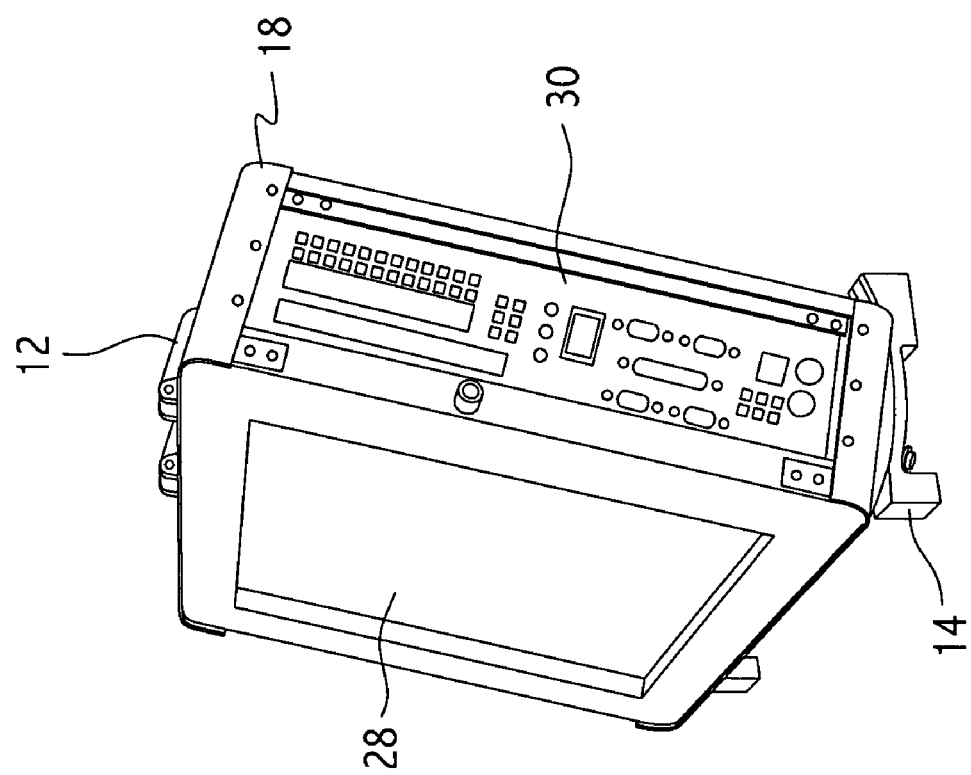
FIG. 7 shows a side view of a portable computer including the bank of input/output connections in accordance with one embodiment of the present invention.
Figure 8:
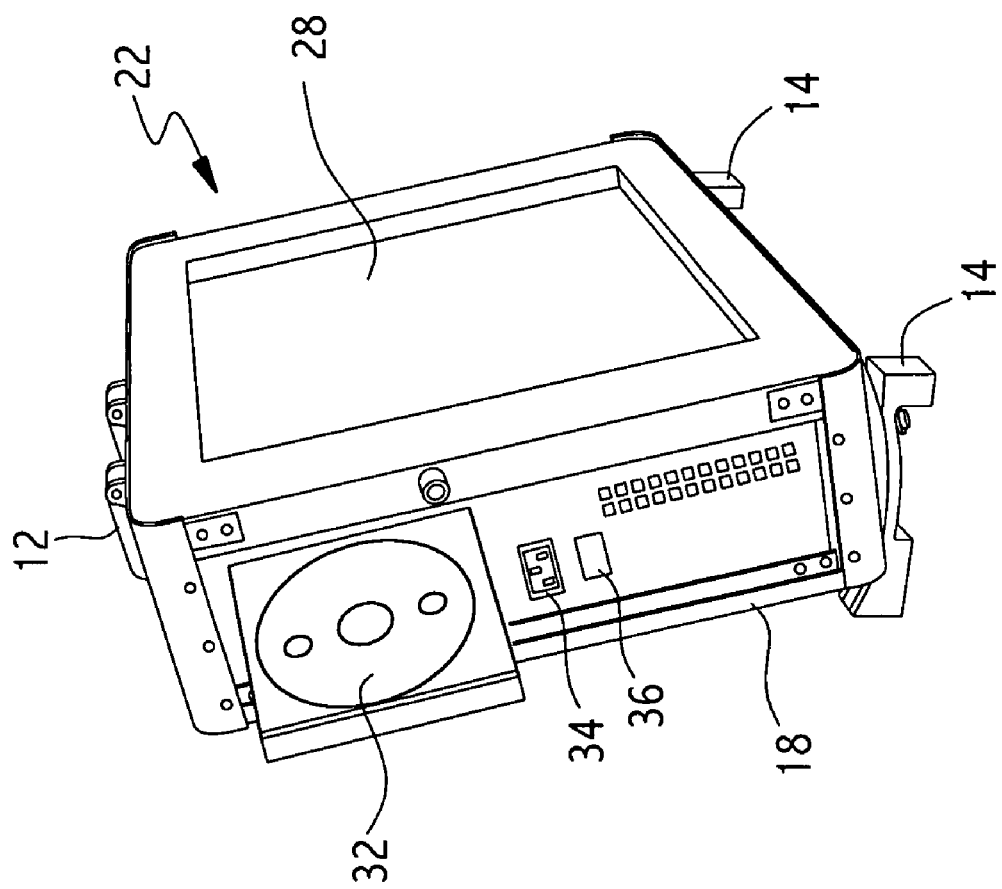
FIG. 8 shows a side view of a portable computer including the disc drive, power switch and power connection in accordance with one embodiment of the present invention.

In order to remove the accessory pack 16, the connector buttons 20 are depressed. As shown in FIG. 5, after the buttons 20 are depressed, the accessory pack 16 begins to slide off the protective case 18. FIG. 6 shows the accessory pack being 16 removed from the protective case 18 while FIG. 7 shows the fully unpacked computer 22. An input/output ("I/O") bank 30 is exposed on the side of the computer 10. The I/O bank 30 contains connections for various accessories for the computer 22 such as: a printer; a monitor, a projector, speakers, a mouse, a keyboard, a microphone, a universal serial bus (USB); an ethernet connection; PCI cards, etc. Connections for a wide variety of peripheral accessories that are used by a computer may be included in the bank 30. FIG. 8 shows the opposite side of the computer 22 than shown in FIG. 7. On this side, a CD-ROM drive 32 is shown along with a power connection 34 and a power switch 36. In should be understood that the configurations shown in FIGS. 7 and 8 reflect only one embodiment of the present invention. Other embodiments may have differing numbers of connections for other accessories and such connections may be arranged in different configurations.

Figure 9:
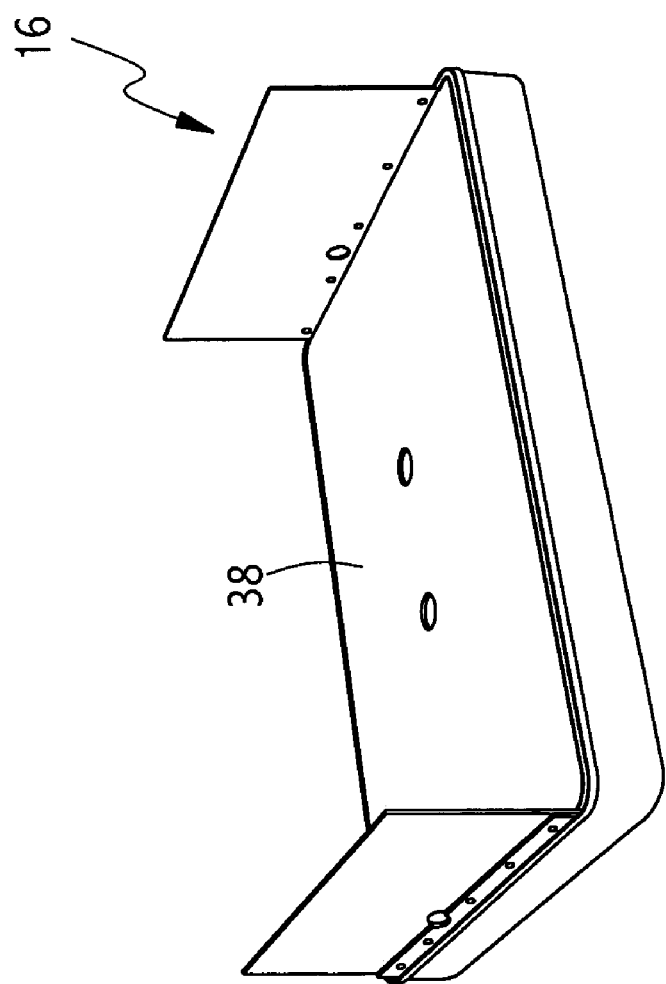
FIG. 9 shows the accessory pack with the screen cover in place in accordance with one embodiment of the present invention.
Figure 10:
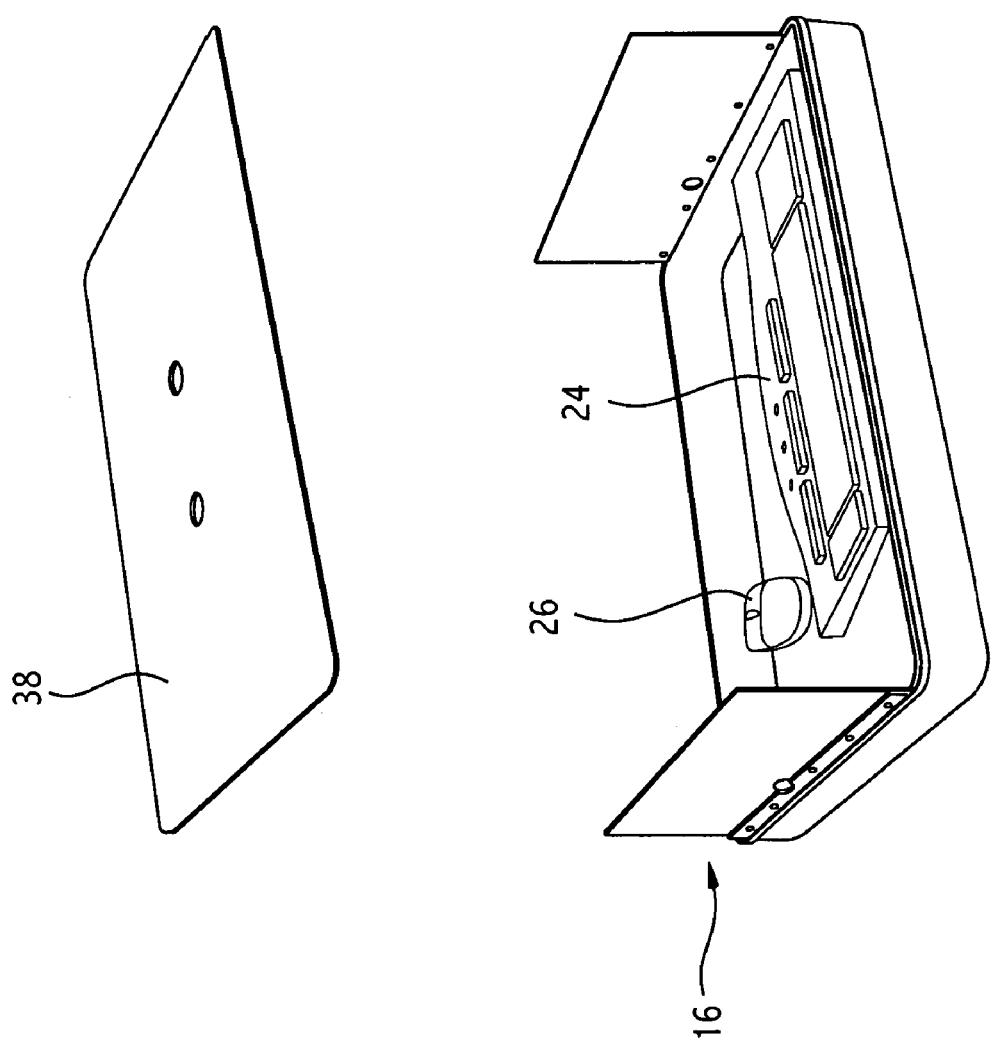
FIG. 10 shows the accessory pack with the screen cover removed to show the stored accessories for the computer in accordance with one embodiment of the present invention.

FIG. 9 shows the removed accessory pack 16 that is used to store accessories for the computer. The storage area is covered by a screen cover 38 that protects the screen 28 of the computer from damage while keeping the stored accessories in place. The screen cover 38 is held in place by snapping it into place in a groove (not shown) around the edge of the accessory pack 16. FIG. 10 shows the accessory pack 16 with the screen cover 38 removed. The screen cover 38 is removed by simply snapping it out of place with the finger holes on the cover. As shown in FIG. 10, the screen cover 38 can hold such accessories as a keyboard 24, a mouse 26, and various connection cables.

Another advantage of the present invention is a "box in box" construction that protects the computer from any sudden impacts or jolts that may damage the machine. The first "box" is the exterior accessory pack 16 and case 18. The box contains an interior suspension system that protects the computer unit. The suspension system minimizes gravitational ("G") forces to the computer unit if the box is dropped. Ideally, the suspension system will protect the box from up to 100 G's if dropped. In this embodiment, the box is made of light weight aluminum that is lined on the interior with a 0.5 inch thick layer of polyurethane foam. This layer of polyurethane serves to isolate and cushion the interior "box" against the force and velocity of an impact. The interior "box" is the computer unit itself. The thickness of the foam may vary in other embodiments according the material composition of the polyurethane and the level of protection needed by the user.

Figure 11:
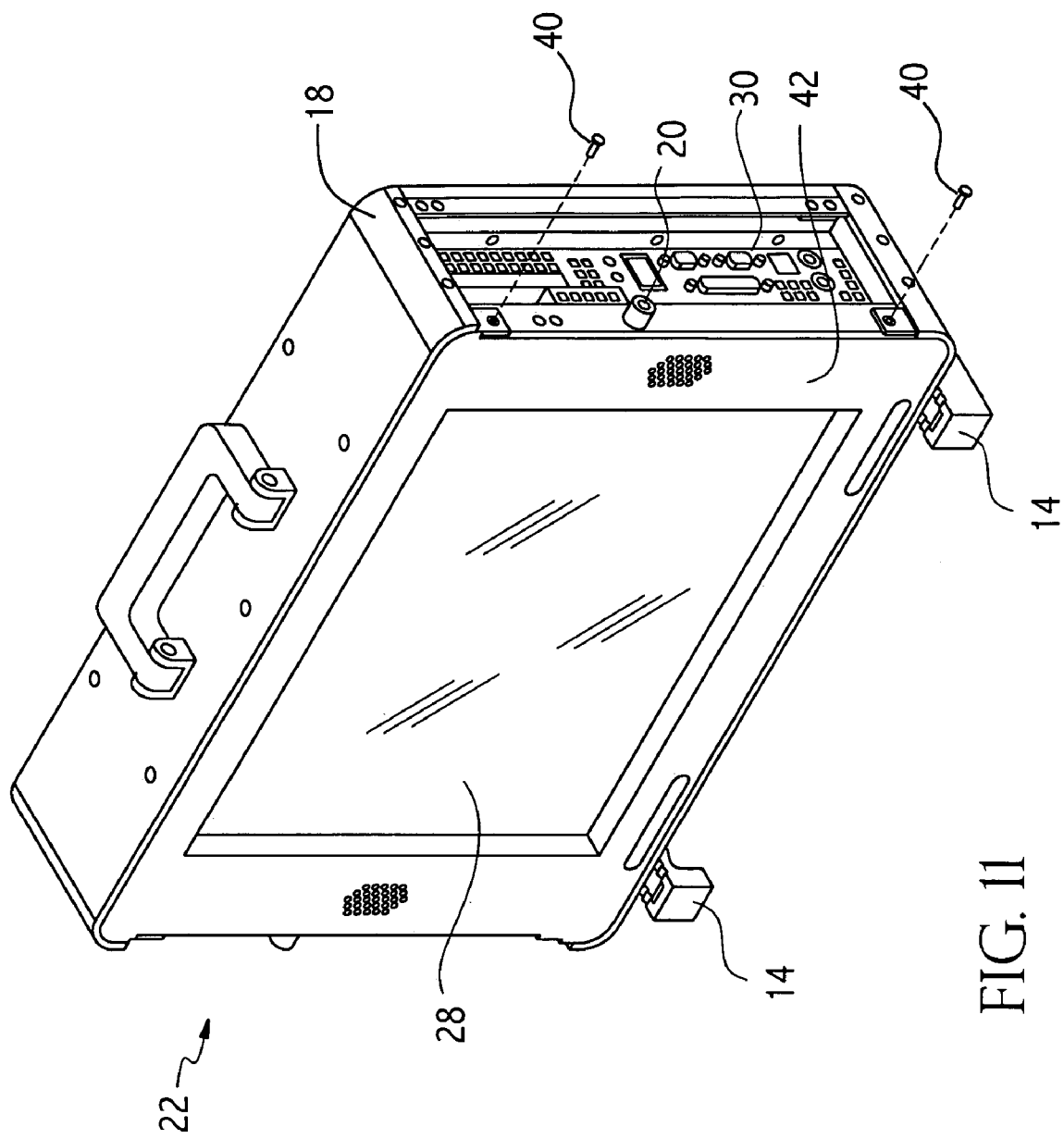
FIG. 11 shows the computer with the bezel being removed in accordance with one embodiment of the present invention.
Figure 12:
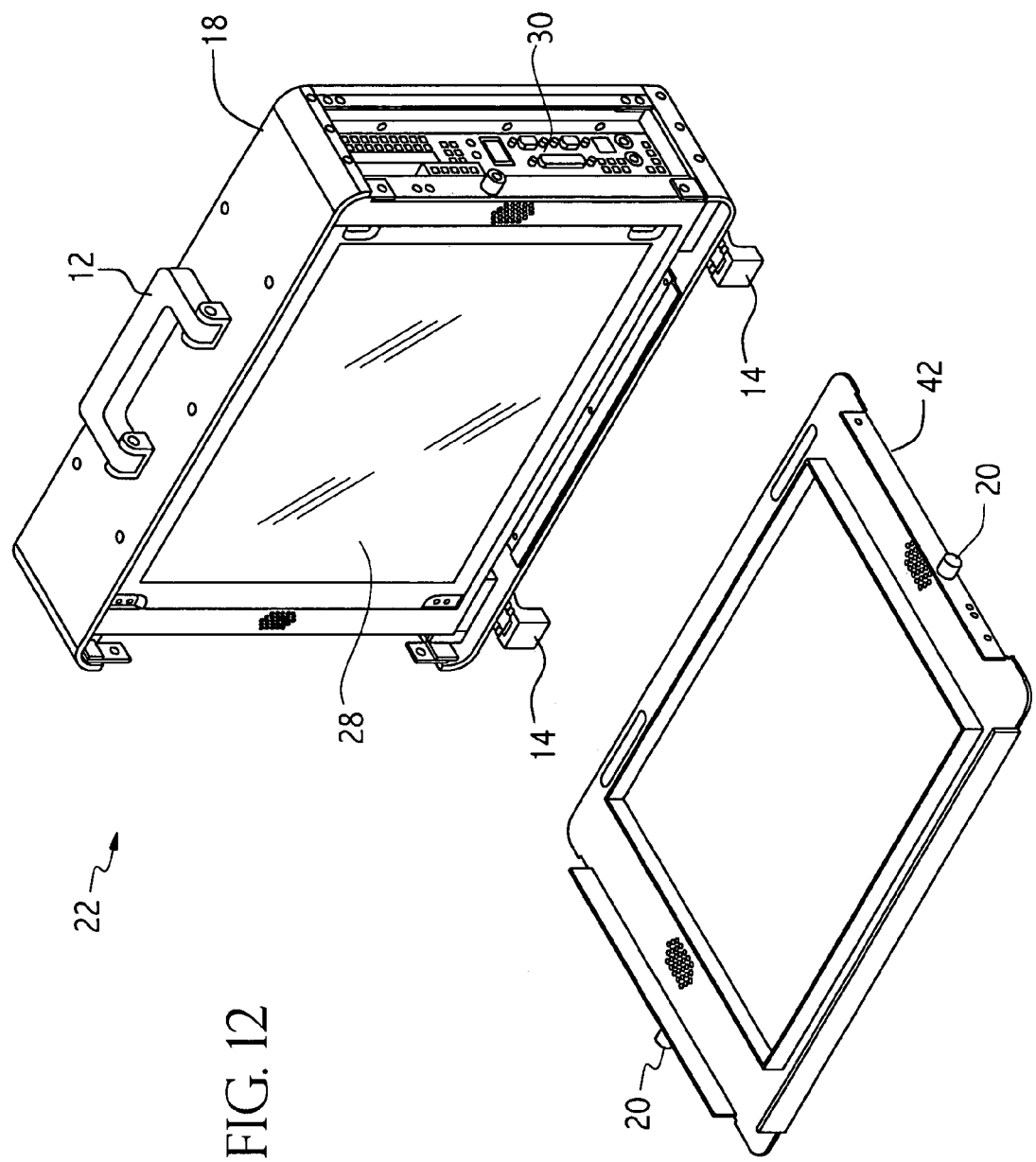
FIG. 12 shows the computer with the bezel removed in accordance with one embodiment of the present invention.
Figure 13:
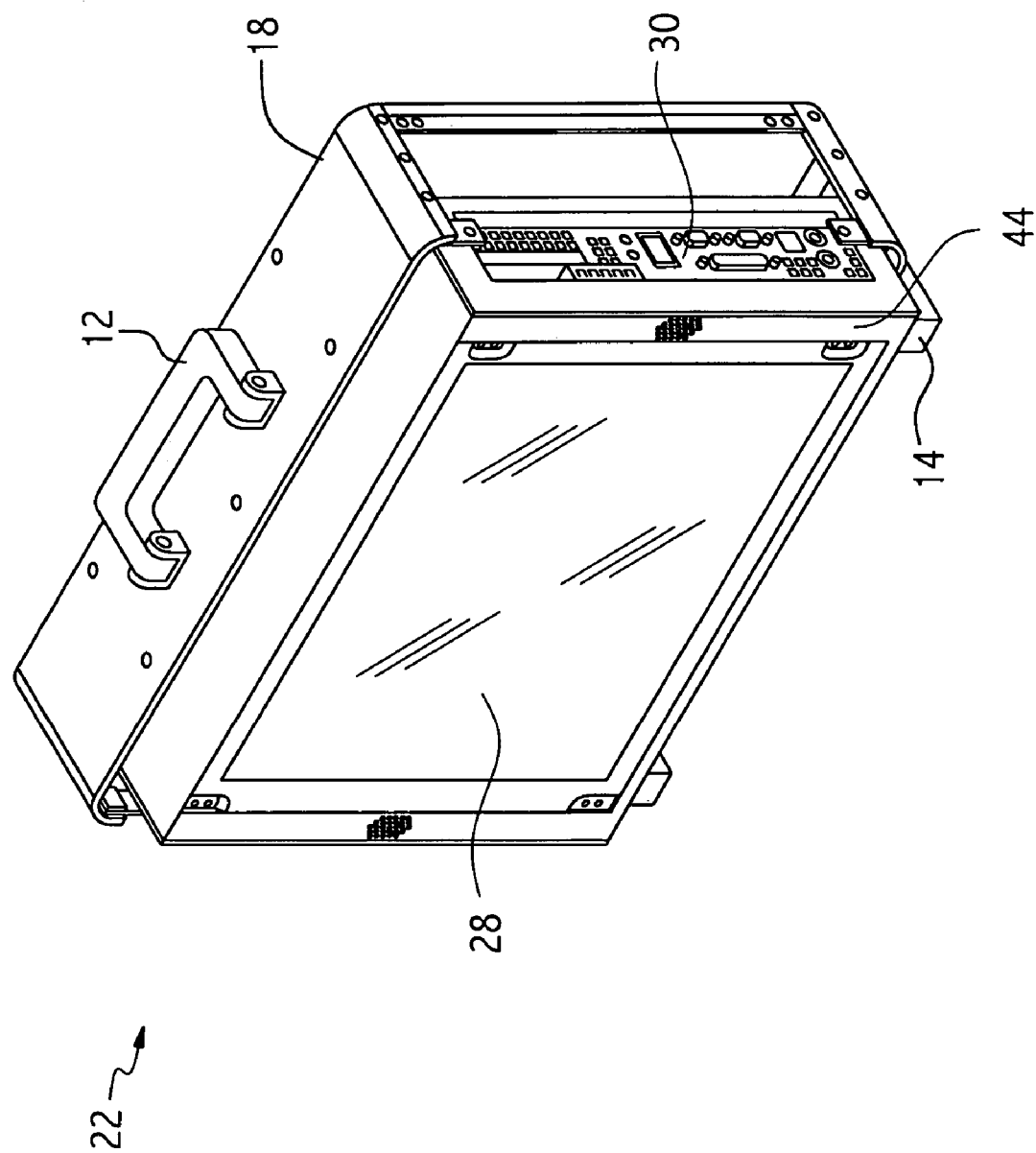
FIG. 13 shows the computer being removed from its protective case in accordance with one embodiment of the present invention.
Figure 14:
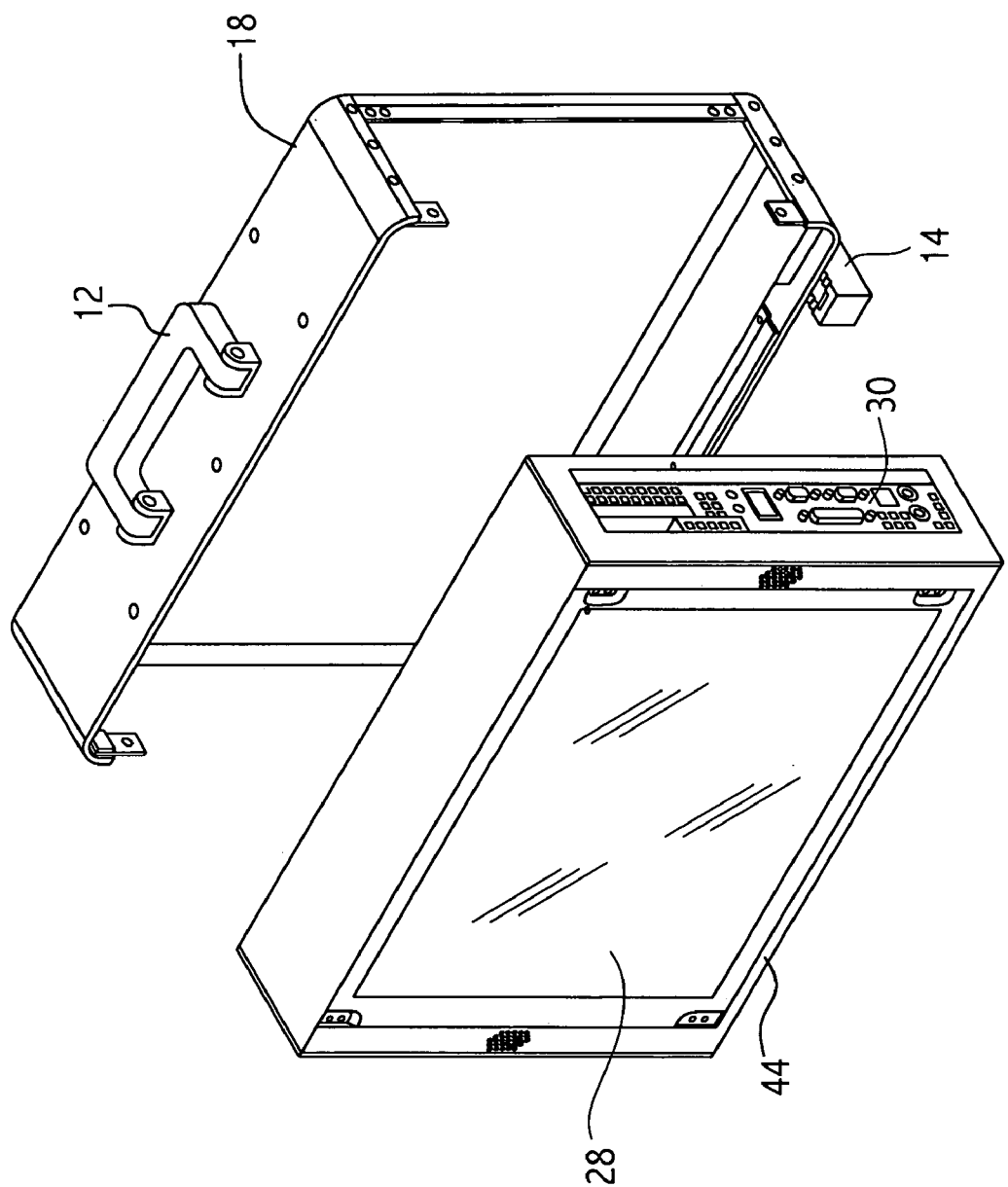
FIG. 14 shows the computer removed from its protective case in accordance with one embodiment of the present invention.

FIGS. 11 through 14 show the procedure for removing the interior box. First, as shown in FIG. 11, the bezel 42 is held in place by several screws 40. Once the screws 40 are removed, the bezel 42 is removed as shown in FIG. 12. Next, the interior box or computer unit 44 is pulled out of the protective case 18 as shown in FIGS. 13 and 14. The flexibility of being able to remove the interior computer unit 44 allows for ease of maintenance and upgrade of the computer. Additionally, the computer unit 44 is rack mountable after it is removed from the protective case 18 with a separate adapter kit.

Figure 15A:
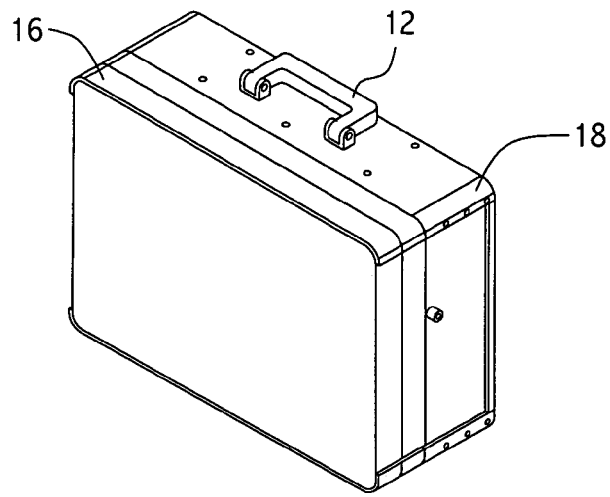
FIG. 15a shows a packed up portable computer with a triple panel screen in accordance with one embodiment of the present invention.
Figure 15B:
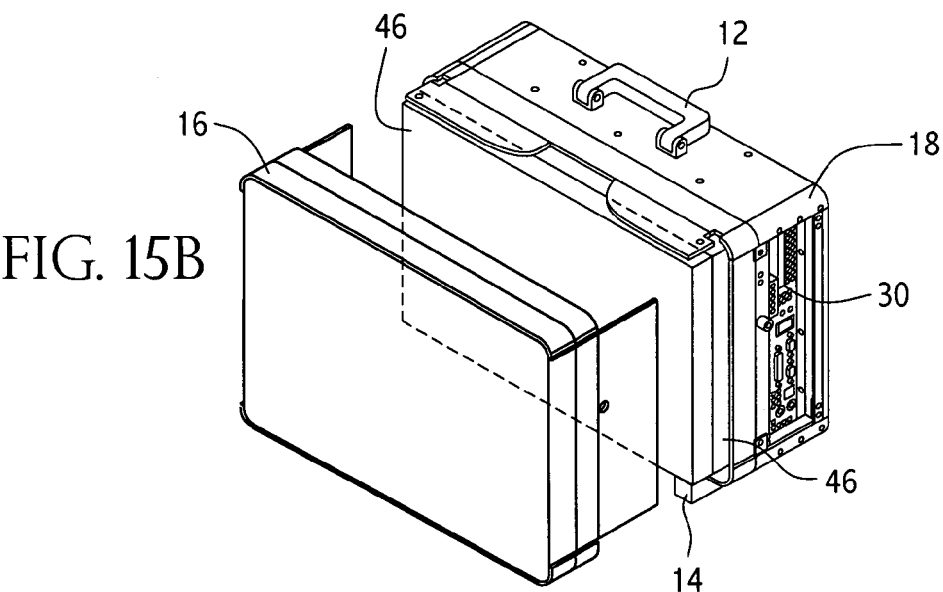
FIG. 15b shows a portable computer with a triple panel screen with the accessory pack being removed in accordance with one embodiment of the present invention.
Figure 15C:
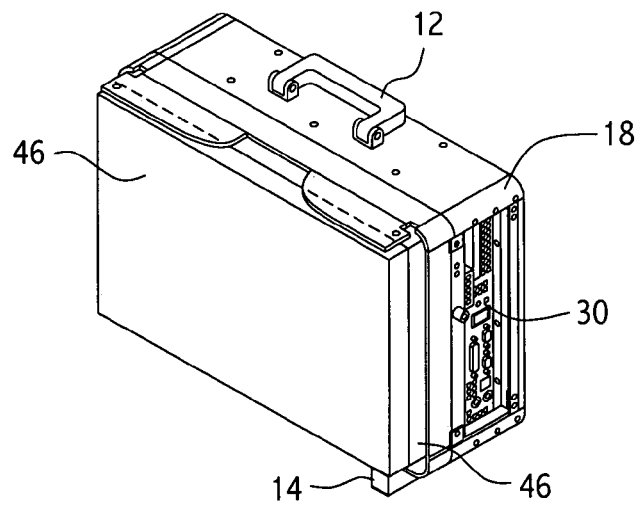
FIG. 15c shows a portable computer with a triple panel screen with the accessory pack removed in accordance with one embodiment of the present invention.
Figure 16:
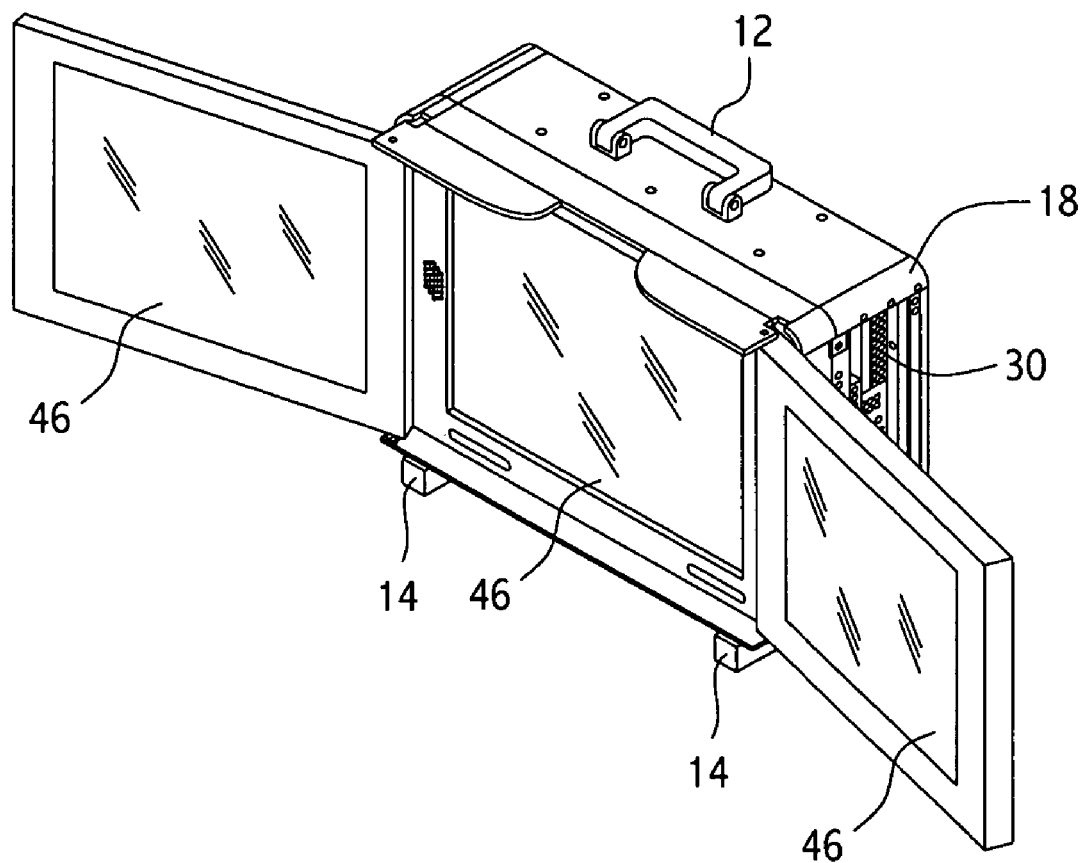
FIG. 16 shows a set up portable computer with a triple panel screen extended in accordance with one embodiment of the present invention.

Other embodiments of the present invention include a portable computer with a triple panel display screen. FIGS. 15A through 15C show a packed up computer 10 with a triple display screen 46 that is folded. The computer 10 is packed up and unpacked in a similar manner as previously described in FIGS. 1 through 6. However, the folded triple display screen 46 will require additional internal space. This may result in 2.5 inches being added to the width of the computer case in some embodiments. FIG. 16 shows the computer set up with the triple display screen panels 46 fully extended.

Other embodiments of the invention include the portable computer configured to act as a portable network server. Additionally, the invention could include a portable computer configured with multiple microprocessors or an SCSI (small computer system interface) array of up to eight SCSI drives. The advantages of the present invention include having a portable computer that is capable of high end workstation performance. The computers could be used for such demanding applications as: CAD (computer aided drafting); video editing; animation; and other graphics intensive applications. Also, the portable computer is ideal for setting up local area networks for such applications as graphics intensive, high performance computer games with multiple networked players.

Figure 17:
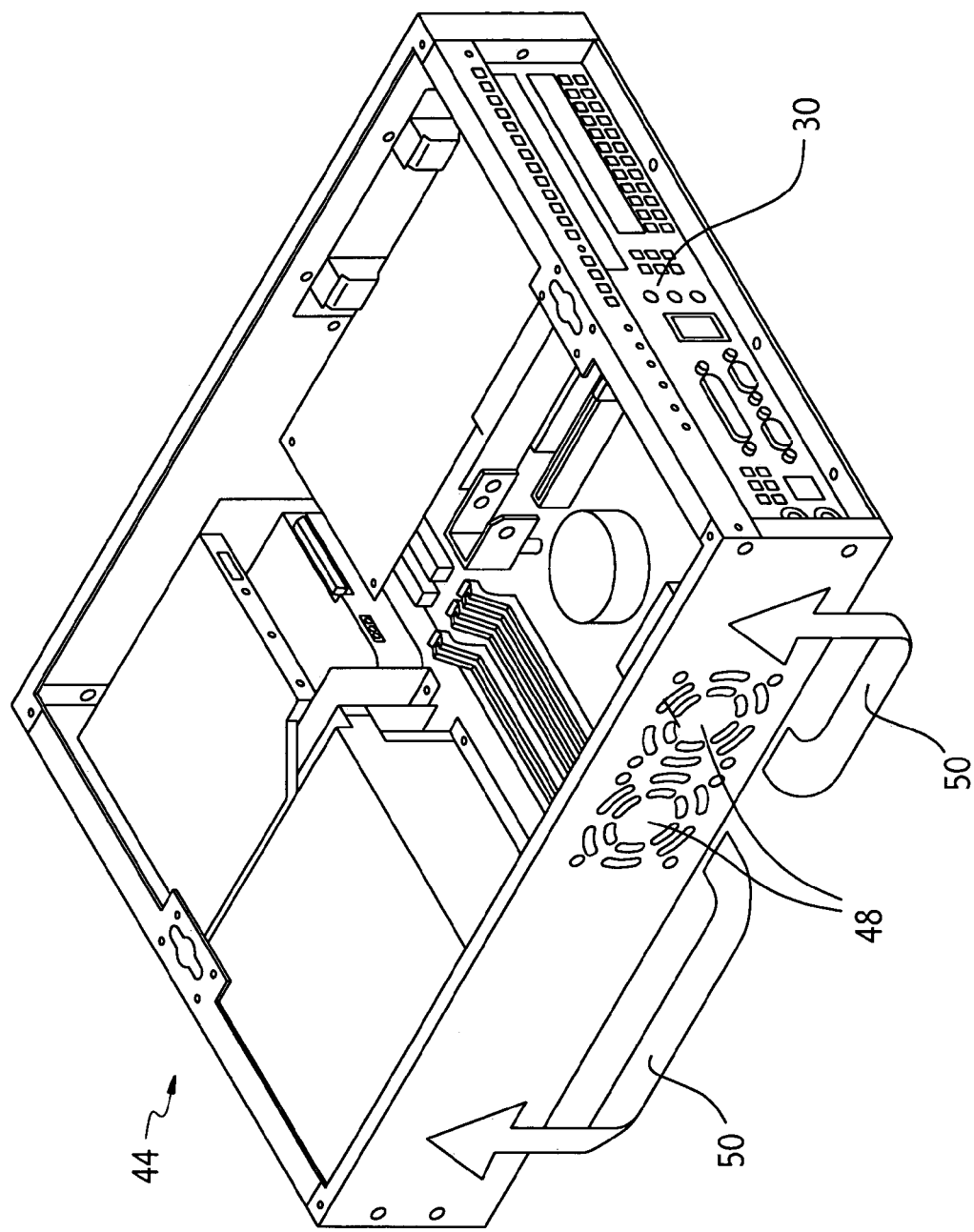
FIG. 17 shows a view of the internal arrangement of the computer with exhaust fans and air flow diagrams in accordance with one embodiment of the present invention.
Figure 18A:
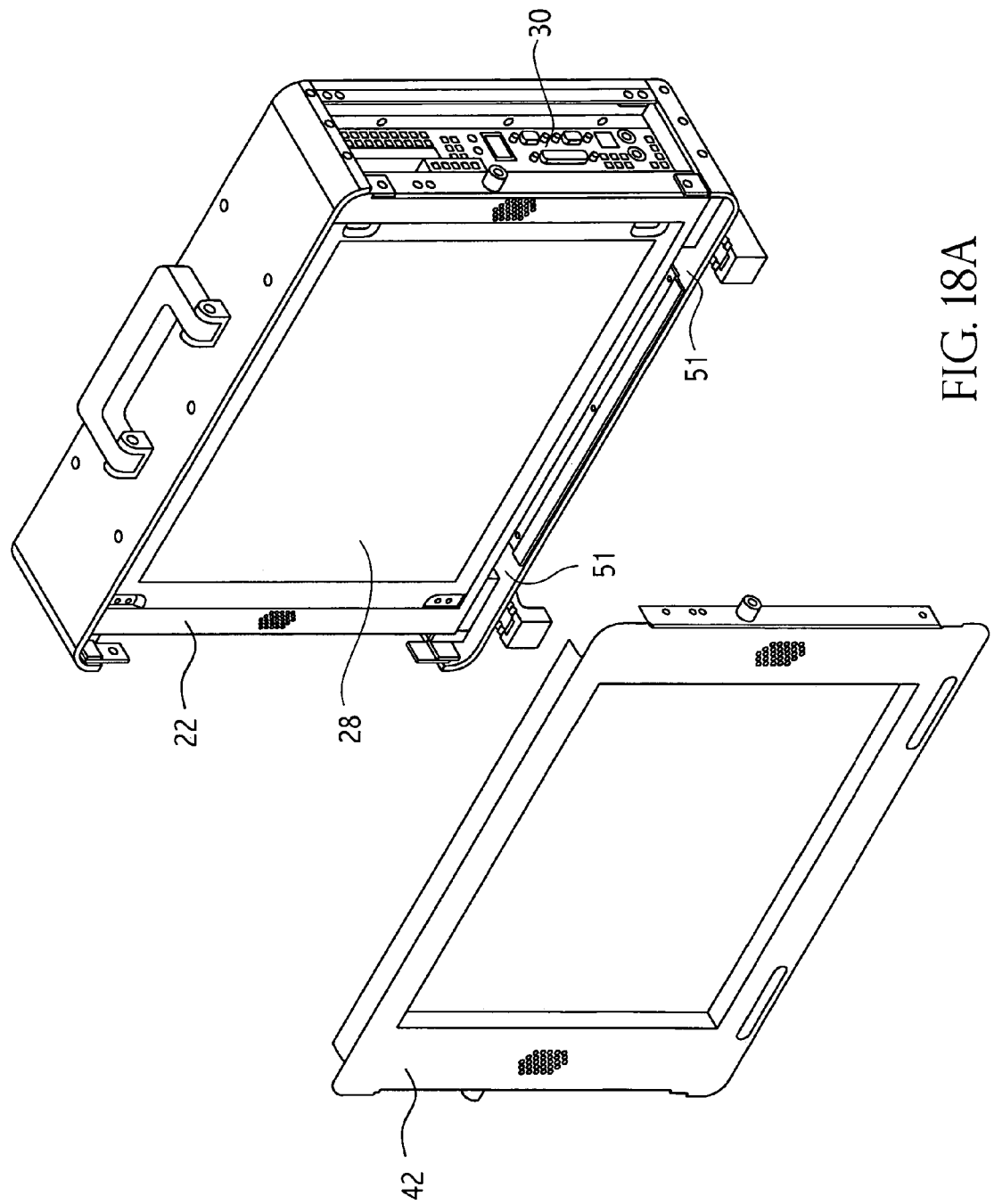
FIG. 18a shows a portable computer with the bezel removed and showing air flow exhaust channels in accordance with one embodiment of the present invention.
Figure 18B:
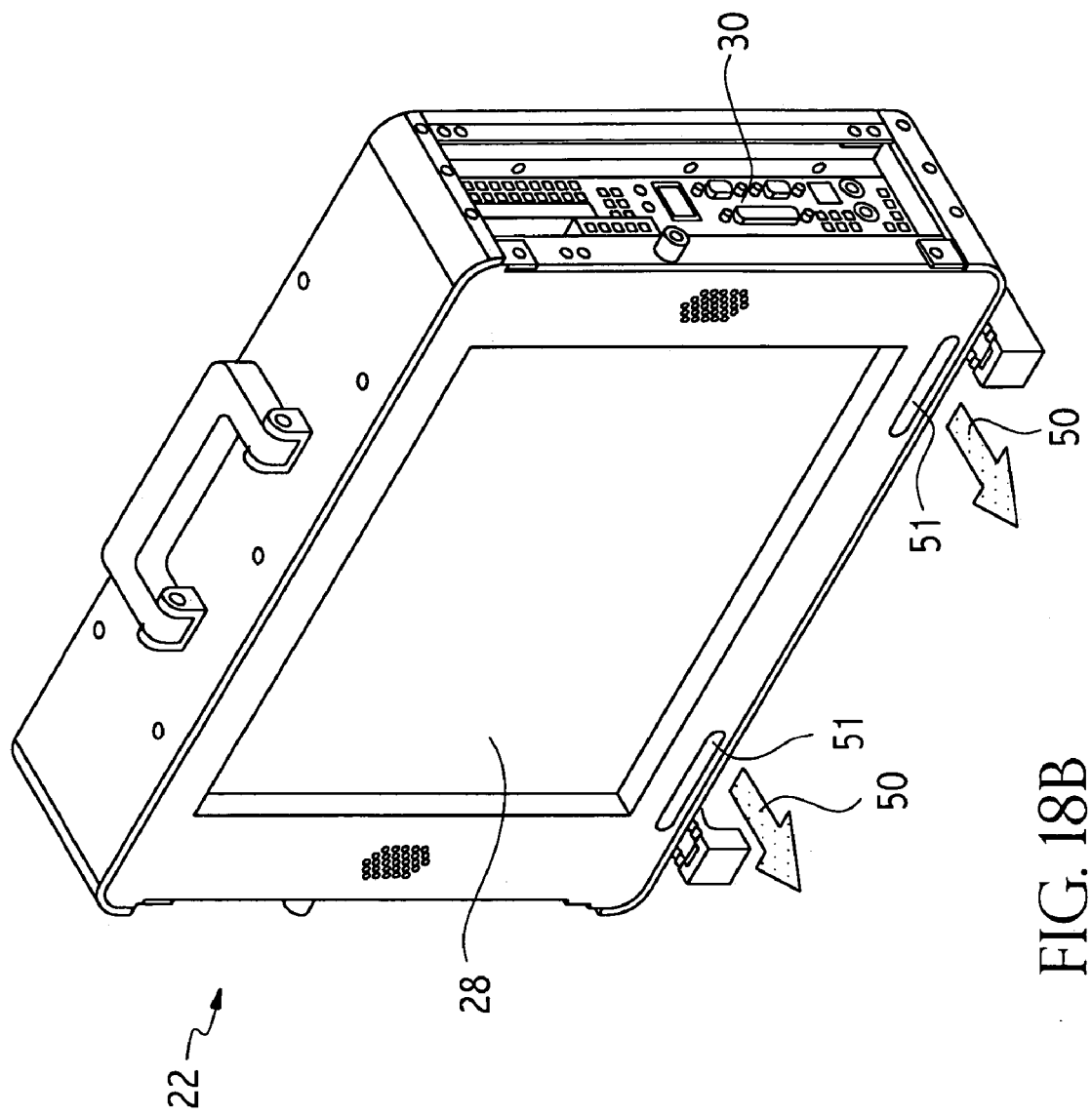
FIG. 18b shows a set up portable computer with air flow diagrams in accordance with one embodiment of the present invention.

FIGS. 17, 18a, and 18b show the thermal cooling system for some embodiments of the present invention. FIG. 17 shows an open top-view of the computer unit 44. In the embodiment shown, the thermal cooling system includes dual exhaust fans 48 that are located on the bottom of the computer unit 44 and adjacent to the I/O bank 30. The fans 48 pull hot air 50 away from the internal components of the computer 44 such as the microprocessor(s), etc. The hot air 50 is expelled from the computer 44 and out through dual air channels 51. FIG. 18a shows the computer with the bezel 42 removed to show the dual air channels 51 that are located on the bottom of the computer 44. FIG. 18b shows the computer 44 with the bezel 42 in place and the air flow 50 exiting out of the dual air channels 51. In this embodiment, the air flow 50 exits the computer in the direction of the user so that the thermal cooling system may be used as a hand warmer for the user.

Figure 19:
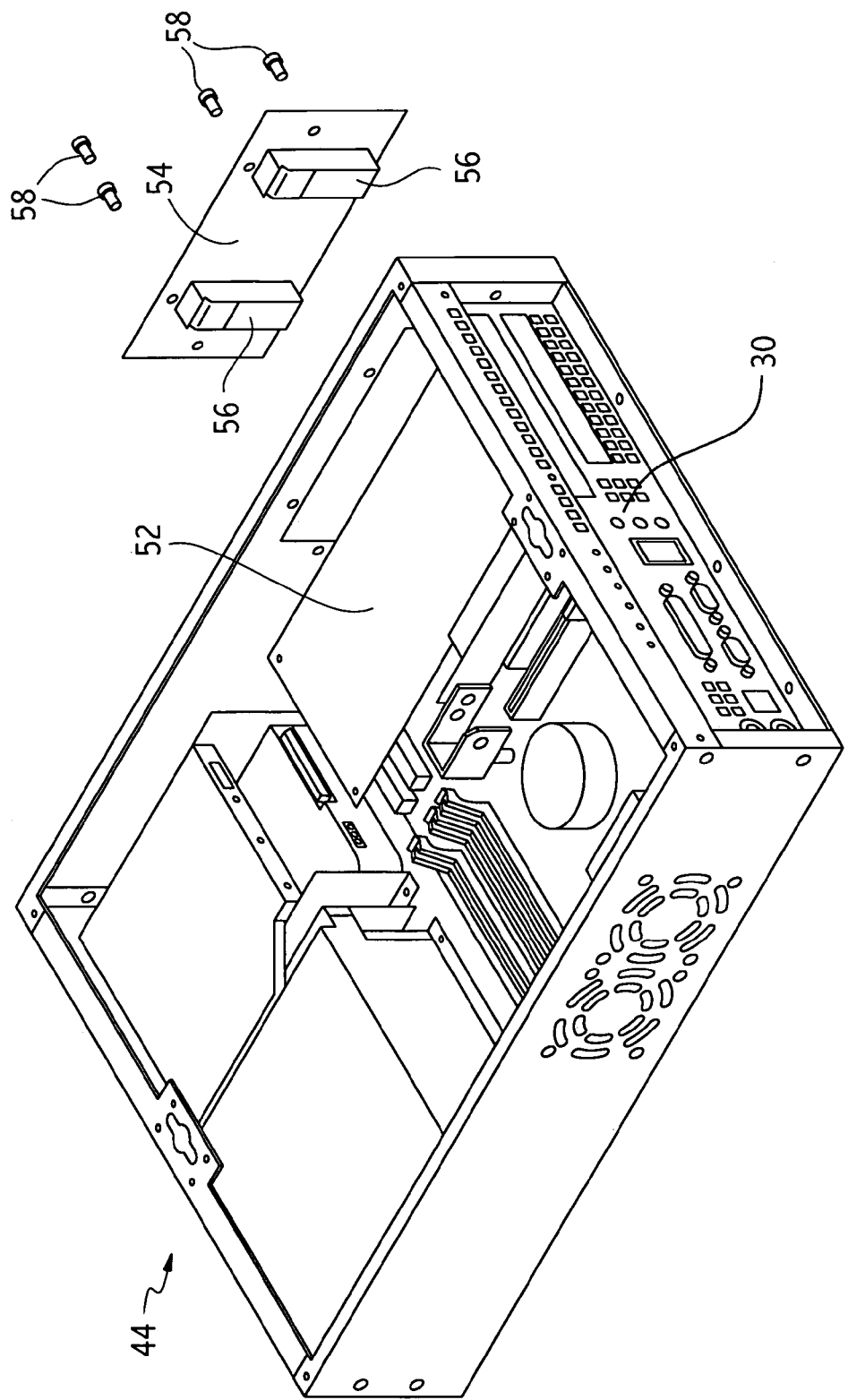
FIG. 19 shows a view of the internal arrangement of the computer with an exploded view of the PCI card retainer support in accordance with one embodiment of the present invention.
Figure 20:
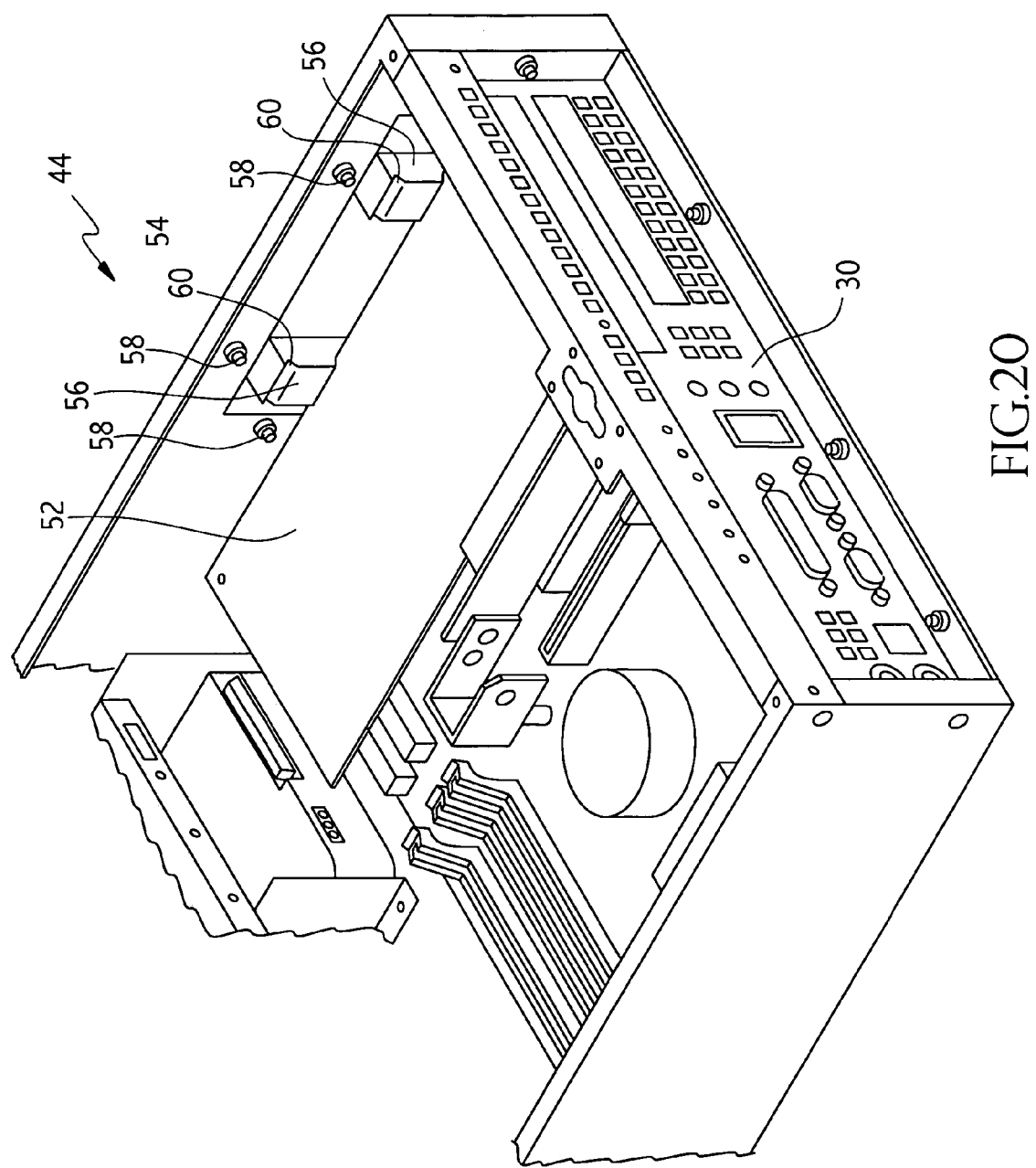
FIG. 20 shows a close up view of the internal arrangement of the PCI card retainer support in accordance with one embodiment of the present invention.

Some embodiments of the present invention include special supports for PCI cards that are installed in the computer. A PCI (Peripheral Component Interconnect) card is a card that is installed in the computer in certain specified internal connecting sockets. The card contains interface circuitry for external components that may be used with the computer. "PCI" refers an industry standard specification for the cards that is known to those of ordinary skill in the art. Typically, computers contain multiple sockets that allow for the installation of more than one PCI card at a time. FIG. 19 shows a view of the internal arrangement of the computer 44 with an exploded view of the PCI card retainer support plate 54. The computer 44 contains PCI card(s) 52 that are located in a corner of the computer adjacent to the top wall of the unit and the I/O bank 30. In this embodiment, the retainer support plate 54 is a removable plate that is attached to an opening in the top of the computer 44 with multiple screws 58. The support 54 has two separate cushions 56 to support the PCI card(s) 52. As shown in FIG. 20, each cushion 56 has a notch 60 that holds its PCI card 52. In this embodiment, the cushions are made of a polyurethane material. The cushions serve to hold the PCI cards in place and prevent disconnection from the connecting sockets during a drop or sudden impact to the computer. In other embodiments, the number, size, shape, and material composition of the cushions may vary according to the internal arrangement and configuration of the PCI cards for the computer.

In summary, the present invention allows for a high performance workstation computer to be portable without any performance limitations. Such advantages include: a tilting mechanism that allows for an ergonomically comfortable screen orientation; a "box in box" construction that protects the interior computer unit from shocks of sudden impacts; storage of accessories in a convenient accessory pack for the computer; an interior computer "box" that can be easily removed from its protective case and rack mounted; a triple display screen configuration for the portable computer; a thermal cooling system; and a retainer support plate for PCI cards.

While the invention has been described with respect to a limited number of embodiments, those skilled in the art, having benefit of this disclosure, will appreciate that other embodiments can be devised which do not depart from the scope of the invention as disclosed here. Accordingly, the scope of the invention should be limited only by the attached claims.

What is claimed is:

1. A portable computer, comprising:
    a computer unit;
    a protective case, where the computer unit is removably mounted within the protective case;
    a protective cover that is detachably connected to the protective case to cover the computer unit; and
    a plurality of footing units, where each footing unit comprises,
        a slide that is attached to the bottom of the protective case, and
        a cradle that sits on a solid surface, where the cradle holds the slide in an internal track.

2. The portable computer of claim 1, where the exterior of the protective case is aluminum.

3. The portable computer of claim 1, where the protective case comprises an suspension system that protects the computer unit.

4. The portable computer of claim 3, where the suspension system comprises an interior protective liner.

5. The portable computer of claim 4, where the interior protective liner is polyurethane.

6. The portable computer of claim 5, where the interior protective liner has a thickness of at least 0.5 inches.

7. The portable computer of claim 1, where the protective cover is detachably connected to the protective case with a plurality of spring loaded connectors.

8. The portable computer of claim 1, where the protective cover stores accessories for the computer unit.

9. The portable computer of claim 1, where the computer unit is rack mountable.

10. The portable computer of claim 1, where the computer unit is a network server.

11. The portable computer of claim 1, where the computer unit is has a flat panel screen.

12. The portable computer of claim 11, where the portable computer has a length of 19 inches, a height of 15 inches, and a depth of 6 inches.

13. The portable computer of claim 1, where the computer unit is has three flat panel screens.

14. The portable computer of claim 13, where the portable computer has a length of 19 inches, a height of 15 inches, and a depth of 8.5 inches.

15. The portable computer of claim 1, where the computer unit has a cooling system that forces air out towards the user.

16. The portable computer of claim 1, where each footing mechanism can tilt the orientation of the protective case to an angle of up to 18 degrees.

17. The portable computer of claim 1, where the computer unit supports a plurality of PCI cards that are held in place by a polyurethane cushion.

18. A portable computer, comprising:
    a computer unit;
    means for protecting the computer unit in a removable case; and
    means for adjusting the orientation of the removable case for ergonomic comfort of a user of the portable computer with a plurality of footing units, where each footing unit comprises,
        a slide that is attached to the bottom of the means for the protecting the computer unit, and
        a cradle that sits on a solid surface, where the cradle holds the slide in an internal track.

* * * * *